US006843423B2

(12) United States Patent
Fruhauf et al.

(10) Patent No.: US 6,843,423 B2
(45) Date of Patent: Jan. 18, 2005

(54) SMART CARD THAT CAN BE CONFIGURED FOR DEBUGGING AND SOFTWARE DEVELOPMENT USING SECONDARY COMMUNICATION PORT

(75) Inventors: Serge F. Fruhauf, Saratoga, CA (US);
David Tamagno, Austin, TX (US);
Jerome Tournemille, Austin, TX (US)

(73) Assignee: STMicroelectronics, Inc., Carrollton, TX (US)

( * ) Notice: Subject to any disclaimer, the term of this patent is extended or adjusted under 35 U.S.C. 154(b) by 204 days.

(21) Appl. No.: 10/388,067

(22) Filed: Mar. 13, 2003

(65) Prior Publication Data

US 2004/0178276 A1 Sep. 16, 2004

(51) Int. Cl.[7] .............................................. G06K 19/06
(52) U.S. Cl. ........................ 235/492; 235/375; 235/380; 235/382.5; 235/383; 705/41
(58) Field of Search ................................. 235/492, 375, 235/380, 383, 382.5; 257/679; 361/737; 705/41; 340/5.22

(56) References Cited

U.S. PATENT DOCUMENTS

| | | | |
|---|---|---|---|
| 5,847,372 A | 12/1998 | Kreft ........................... | 235/492 |
| 6,151,647 A * | 11/2000 | Sarat ........................... | 710/301 |
| 6,168,077 B1 | 1/2001 | Gray et al. .................. | 235/375 |
| 6,343,364 B1 * | 1/2002 | Leydier et al. ............. | 713/500 |
| 6,439,464 B1 | 8/2002 | Fruhauf et al. ............. | 235/492 |
| 6,581,122 B1 * | 6/2003 | Sarat ........................... | 710/301 |
| 2002/0066791 A1 | 6/2002 | Leydier et al. ............. | 235/492 |

FOREIGN PATENT DOCUMENTS

| | | | |
|---|---|---|---|
| WO | WO 99/49415 | 9/1999 | .......... G06K/19/00 |
| WO | WO 01/96990 | 12/2001 | ............. G06F/1/00 |

* cited by examiner

*Primary Examiner*—Karl D. Frech
*Assistant Examiner*—Daniel Walsh
(74) *Attorney, Agent, or Firm*—Lisa K. Jorgenson; Christopher F. Regan

(57) ABSTRACT

An integrated circuit for use with smart card and method are operative in both an ISO mode in accordance with the International Standards Organization 7816 (ISO 7816) protocol, and a non-ISO mode in accordance with a non-ISO protocol. The dual-mode integrated circuit includes a microprocessor and switching block. An external interface is connected to the switching block and comprises an ISO port operative for communicating in an ISO mode when the ISO mode is detected and a non-ISO port operative for communicating in a non-ISO mode when a non-ISO mode is detected. The ISO port is configured to allow debugging and/or software development through a serial interface in a non-ISO mode and the non-ISO port is configured to allow debugging and/or software development through the

30 Claims, 3 Drawing Sheets

SMART CARD THAT CAN BE CONFIGURED FOR DEBUGGING AND SOFTWARE DEVELOPMENT USING SECONDARY COMMUNICATION PORT

FIELD OF THE INVENTION

This invention relates to the field of smart cards, and more particularly, this invention relates to debugging and software development of a dual-mode smart card using a secondary communication port for debugging code or extracting variable or data from registers.

BACKGROUND OF THE INVENTION

Smart cards are plastic cards having an embedded Integrated Circuit (IC). That IC may be a logic circuit with its associated memories or a microcontroller with its associated memories and software, or a microcontroller with its associated memories and software coupled to a custom circuit block or interface.

To use the computing power of the IC, a smart card makes use of a full set of packaging technologies. For example, the die size varies from 1 $mm^2$ to 30 $mm^2$, but is limited because of the mechanical limitations imposed by the plastic construction of the smart card. The IC is attached to a lead frame and wire-bonding techniques are used to connect the IC pads to the lead frame contacts. Potting or other strengthening methods can be used to protect the IC against chemical and mechanical stresses during manufacturing and are a part of everyday usage of a smart card. Eight contacts are located on one side of the card. The smart card performs transactions with a smart card reader using a serial protocol. The mechanical and electrical specifications for a smart card are published by the International Standard Organization (ISO) as ISO7816-X standards, which have allowed the simple and massproduced magnetic stripe cards to evolve toward the smart card. This natural evolution has allowed smart cards, depending of the IC complexity, of course, to perform pre-paid accounting, cryptographic scheme, personal authentication using a PIN code, biometrics, and java scripts, for example.

ISO documents ISO 7816-1 Physical Characteristics, ISO 7816-2 Dimensions and Locations of the contacts, ISO 7816-3 Electronic signals and transmission protocols, ISO 7816-4 Interindustry Commands for Interchange, and ISO 7816-10 Electronic signals and answer to reset for synchronous cards are incorporated herein by reference.

In operation, smart card readers are recognized by the reader infrastructure or a host computer prior to performing any transaction involving a smart card. The infrastructure runs an application involving the smart card. The half duplex protocol between the smart card and the smart card reader, in which either the smart card sends information to the smart card reader or vice versa, cannot start until a smart card is in place and detected by the smart card reader. The infrastructure manages authentication or transactions for pre-paid cards in public telephony, for Bankcards in Point-of-Sale (POS) terminals and Automatic Teller Machines (ATM), for Pay TV providers in set top boxes, and for wireless telecom operators in Subscriber Identification Modules (SIM) used in Global System for Mobile (GSM) terminals. Except for SIM cards, all other smart card reader applications use a physical sensor to detect the smart card. This sensor tells the smart card reader when a smart card is in place, i.e., when the smart card lead frame contacts mate with the smart card reader contacts.

When the smart card reader has established that a smart card is in place, a power-up sequence begins. After this power-up sequence has finished, the smart card reader typically provides a clock to the smart card and releases a reset signal. The smart card then executes its stored Operating System (OS). The SIM card, on the other hand, is in place only once with the power-off and used constantly subsequent to its positioning.

The first application for smart card technology was the public telephone system. The smart card die size was typically less than 1 $mm^2$, and only memories and logic circuits were integrated in the IC. The smart card reader used all eight contacts to interface properly with the different smart card generations. When the smart card was inserted in the payphone, the telephone infrastructure authenticated the smart card and the telephone removed "units" from the smart card.

The banking industry subsequently adopted smart cards. The die size was about 10 $mm^2$, and a microcontroller and its associated memories and software were integrated in the IC. The smart card reader used up to six contacts to interface properly with the different smart card generations. When a smart card was inserted in the ATM or the POS (point-of-sale), the smart card user was authenticated with a PIN code. The smart card could store different items, such as the balance of cash received from an ATM on a per week basis or details of purchases since a last closing date. Based on this information, authorization could be issued on the spot once the PIN had authenticated the debtor. This was accomplished without telephone calls to the bank.

Another application for smart cards has been developed by GSM manufacturers. The die size in a SIM is about 30 $mm^2$, and a microcontroller and its associated memories and software are integrated in the IC. The SIM reader uses five contacts to interface properly with the smart card. The more sophisticated smart card applications are performed in GSM using Java applets.

A new market for the smart card has emerged with the growth of the internet accessed from a personal computer. Secure message, Public Key Infrastructure, Authentication and Electronic Payment are new smart card areas of interest. The smart card acts as an e-commerce facilitator. One advantage of a smart card compared to other solutions is the smart card PIN and cryptographic keys can be stored in its memory and never leave the smart card to be communicated in any transaction.

Presently, a smart card is inserted into a smart card reader connected to a host computer. Two protocols are involved in supporting transactions between the smart card and host computer. The first protocol complies with the ISO-7816-3, which provides detailed requirements for the serial interface between smart card and smart card reader. The reader is connected to the computer via a serial port, a parallel port, or the Universal Serial Bus (USB), using a second protocol. The smart card reader contains electronic circuits and embedded software that enable communication between the smart card using the first protocol and the host computer using the second protocol. The host computer is loaded with any appropriate drivers to support the smart card reader.

Many countries have begun to use the smart card in the PC environment. The die size used in these applications ranges from 5 $mm^2$ to 30 $mm^2$, and the microcontroller and its associated memories and software are integrated in the IC typically with a cryptocontroller. Sometimes, a bio-sensor is integrated. The smart card reader uses at least five contacts to interface properly with the smart card in these applications.

Since the late 1990's, the universal serial bus (USB) has become firmly established and has gained wide acceptance in the PC marketplace. The USB was developed in response to a need for a standard interface that extends the concept of "plug and play" to devices external to a PC. It has enabled users to install and remove external peripheral devices without opening the PC case or removing power from the PC. The USB provides a low-cost, high performance, half-duplex serial interface that is easy to use and readily expandable.

USB uses four wires. The power supply is carried with two wires (VBus and ground), and data is carried with the other two wires (D+, D−). The latest version of the USB is currently defined by the Universal Serial Bus Specification Revision 2.0, written and controlled by USB Implementers Forum, Inc., a non-profit corporation founded by the group of companies that developed the USB Specification.

In particular, Chapter 5 USB Data Flow Model, Chapter 7 Electrical, Chapter 8 Protocol Layer and Chapter 9 USB Device Framework of Universal Serial Bus Specification are incorporated herein by reference. The increasingly widespread use of the USB has led smart card reader manufacturers to develop USB interfaces for connection of their products to host computers to complement the existing serial and parallel interfaces.

Although some industries, e.g., banking, have used smart card technology for years, internet users have not taken advantage of smart card technology. Although most internet transactions originate from a PC, and despite some efforts from PC manufacturers, the PC industry has failed to install on each PC a cost effective smart card reader that meets the specific needs of web related applications. To aid this process, "dual mode" smart cards have been developed.

U.S. Pat. No. 6,439,464 to Fruhauf et al., the disclosure which is hereby incorporated by reference in its entirety, discloses a dual mode smart card IC that operates in a first mode, such as an ISO mode in accordance with International Standards Organization 7816 (ISO) protocol, and a USB mode in accordance with the universal serial bus (USB) protocol. This dual-mode IC is implemented as a smart card and includes a microprocessor, switching block, and external interface.

A voltage supply pad, a ground or reference voltage pad, a first set of pads for the first mode, and a second set of pads for the USB mode, form the interface. The first set of pads preferably includes a reset pad, clock pad and an input/output pad in accordance with the ISO 7816 protocol. The second set of pads preferably includes a D+ pad and a D− pad in accordance with the USB protocol. The IC further includes a mode configuration circuit comprising a USB mode detector connected to at least one of the D+ and D− pads. A pull-up resistor preferably connects to one of the D+ and D− pads and a USB voltage detector preferably connects to the voltage supply pad. A latching circuit is connected between the switching block and USB detector, and a control register is connected to the latching circuit for storing a low configuration indicator.

When the dual-mode IC is configured in the USB mode, the first set of pads is disabled based on verification of the USB voltage. When the dual-mode IC is configured in the ISO mode, the second set of pads is disabled after the USB-mode condition is not detected.

The smart cards that are dual mode smart cards as described above and that support ISO 7816 or the USB standard are currently configured in user mode with only one of these communication ports. When the USB port is enabled, the ISO 7816 port is disabled. On the other hand, when the ISO 7816 port is enabled, the USB port is disabled. A primary reason for this functionality is security. It is not desirable to allow potential hackers or software pirates any opportunity to extract from the smart card any information and data regarding the embedded code. In the block and/or lock of the operating mode for the USB or the ISO 7816 mode, the hardware is automatically switched to the corresponding mode after mode detection. Although this provides security when the card is in operation during debugging, however, or in the development of the embedded code, it would be advantageous to use a secondary communication port to download debugging codes or extract data regarding variable or registers. This is not possible with a current ISO or USB smart card.

Some prior art systems have used a Joint Test Action Group (JTAG) interface port. This solution requires additional hardware support, which is costly. A more feasible solution would use predominantly software without the additional hardware, such as the JTAG interface port.

SUMMARY OF THE INVENTION

It is therefore an object of the present invention to provide a system and method to allow debugging and software development of embedded code or data extraction regarding variables or registers with a current ISO or non-ISO, such as a USB smart card.

The present invention advantageously uses an inactive port, for example, the secondary communications port, for debugging code or extracting variable or registers information in a dual mode smart card. Thus, a debugging port is provided for a USB smart card operating in the USB mode as user mode and provides a debugging port for an ISO/USB smart card operating in ISO mode as the user mode. The security of the smart card is guaranteed as the debug port is accessible only for debugging samples on DIL format.

In accordance with the present invention, an integrated circuit is operable for use with the smart card and operative in both an ISO mode in accordance with the International Standards Organization 7816 (ISO 7816) protocol, and a non-ISO mode in accordance with a non-ISO protocol. This integrated circuit includes a microprocessor and a switching block connected to the microprocessor. An external interface is connected to the switching block and comprises an ISO port operative for communicating in an ISO mode when an ISO mode is detected and a non-ISO mode operative for communicating in a non-ISO mode when a non-ISO mode is detected. The microprocessor and switching block are operative for configuring the ISO port to allow debugging and software development through a serial interface in a non-ISO mode and allowing debugging and software development through the non-ISO port in an ISO mode.

In one aspect of the present invention, the non-ISO mode comprises a USB mode. A mode configuration circuit is connected to the switching block and configures the integrated circuit in one of the ISO or non-ISO modes. The mode configuration circuit is also operative for detecting a non-ISO mode or ISO mode upon a power-on-reset. The ISO port can comprise a serial interface through which debugging occurs when configured in non-ISO mode. This serial interface can be a I/O contact. A circuit can disable one of the non-ISO port or ISO port used for debugging and software development after debugging and software development is completed.

In yet another aspect of the present invention, a dual-mode smart card includes a dual-mode integrated circuit carried by a card body and includes la first set of contacts forming an ISO port and including serial I/O, clock and reset contacts used in an ISO mode when an ISO mode is detected and a second set of contacts forming a USB port and including D+ and D− contacts used in a USB mode when a USB mode is detected.

A mode configuration circuit can be connected to the switching block for configuring the dual-mode integrated circuit in one of the ISO or non-ISO modes and operative for detecting the USB mode and ISO mode upon a power-on-reset. In one aspect of the invention, a reset contact can be switched and deselected and the clock and I/O pins maintained available at a power-on-reset when a USB mode is detected. A latch circuit can latch a mode signal as a control signal for switching and deselecting a reset contact in a USB mode for debugging and/or software development through the ISO port. A status register can store a mode bit operative for jumping to a USB protocol. A circuit can be used for disabling one of the USB port or ISO port used for debugging and/or software development after debugging and/or software development is completed.

A method of operating a dual-mode integrated circuit for use with the smart card and operative in both an ISO mode in accordance with the International Standards Organization 7816 (ISO 7816) protocol, and a non-ISO mode in accordance with the non-ISO protocol is disclosed. The method comprises the steps of detecting a non-ISO mode or ISO mode of operation and configuring the dual-mode integrated circuit for communicating in ISO or non-ISO mode through a respective ISO or non-ISO port. It also allows debugging and/or software development through a serial interface of the ISO port when a non-ISO mode has been detected and debugging and/or software development through a non-ISO port when an ISO mode has been detected.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The present invention advantageously solves prior art problems associated with debugging or developing embedded code. The present invention allows a secondary communication ports for downloading debugging code or extracting variable or registers information that was not possible with current ISO or USB smart cards. Thus, a debugging port is provided for a USB smart card operating in USB mode as user mode and for an ISO/USB smart card operating in ISO mode as user mode. The security of the smart card is guaranteed because the debug port is accessible only for debug samples on DIL format.

For purposes of background, a dual mode integrated circuit similar to that disclosed in U.S. Pat. No. 6,439,464 and modified for use in the present invention and set forth in FIG. 1 for background material. The present invention is not limited to a dual-mode smart card, but can be used on USB only smart cards.

It should be understood that to detect and configure the USB or ISO mode of smart cards as will be explained below, there are several circuits, including a USB/ISO mode detection circuit, a switching block circuit and status and control registers, which could include various delay and latch circuits.

Figure 1:
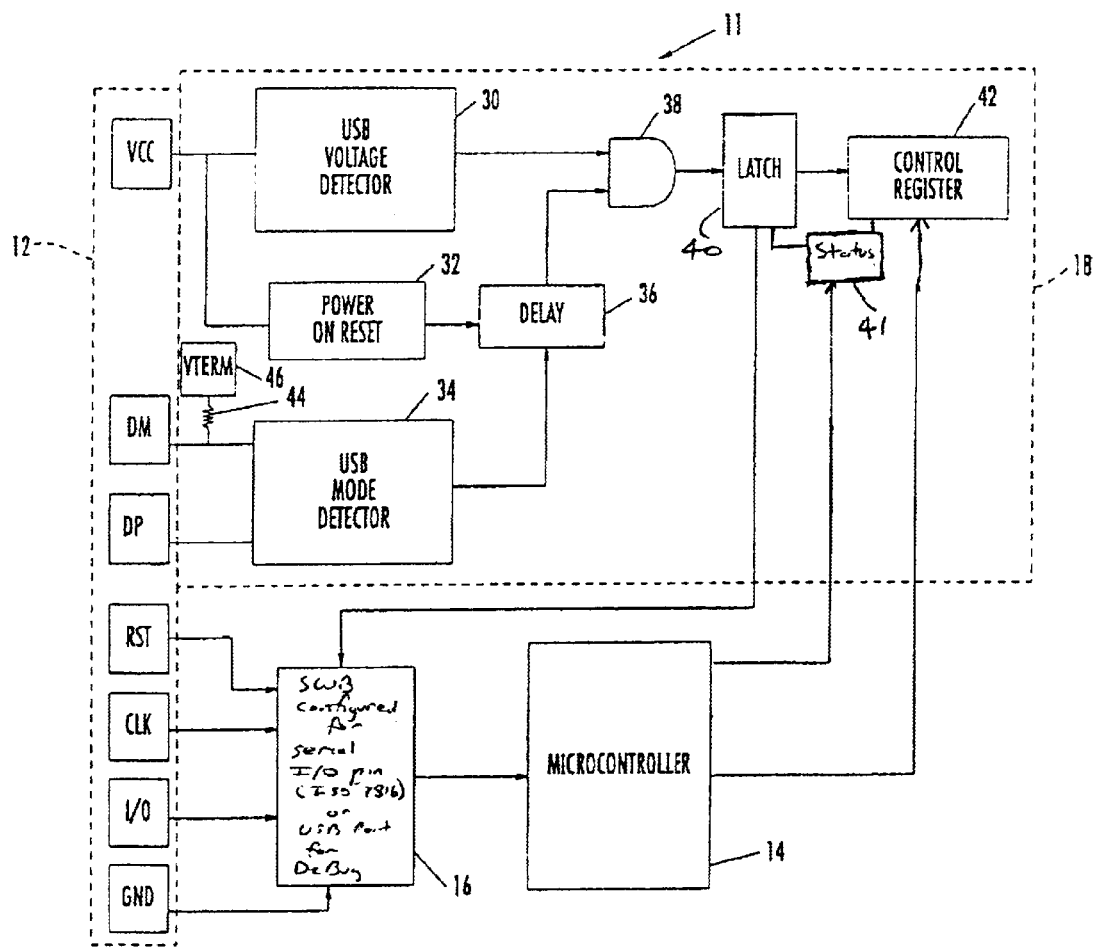
FIG. 1 is a block diagram of a dual-mode integrated circuit that could be modified for use in accordance with the present invention.

The dual-mode integrated circuit 11 illustrated in FIG. 1 is capable of operating in a first mode such as an ISO mode in accordance with the International Standards Organization 7816 (ISO 7816) protocol, and a second non-ISO mode such as a USB mode in accordance with the Universal Serial Bus (USB) protocol. The dual-mode IC 11 operates selectively in one mode or the other, but not in both modes simultaneously.

The dual-mode IC 11 is situated preferably in the smart card 10 and could be a smart card module as understood by those skilled in the art, and includes a microprocessor 14, a switching block 16, and the external interface 12. The external interface 12 comprises a number of contacts (or pads as used herein), including a voltage supply pad VCC, a reference voltage/ground pad GND, a first set of pads for the ISO mode, and a second set of pads for the nonISO mode. The first set of pads preferably includes a reset pad RST, a clock pad CLK and an input/output I/O pad in accordance with the ISO 7816 protocol. The second set of pads preferably includes a D+ pad DP and a D− pad DM in accordance with the USB protocol. A pull-up resistor 44 and Vterm circuit 46 connect to one of the D+ or D− pads or contacts.

Because the IC 11 operates in one of the two modes which have different external interfaces, the IC will need to determine in which mode to operate. The IC 11 includes a mode configuration circuit 18 comprising a USB mode detector 34 connected to at least the D− pad.

The USB mode detector may also be connected to the D+ DP pad. The mode configuration circuit 18 may also include a USB voltage detector 30 connected to the voltage supply pad VCC for detecting a USB mode voltage supply, a latching circuit 40 connected to the switching block and receiving outputs from the USB mode detector 34 and the USB voltage detector 30, and a control register 42 connected to the latching circuit 40 for storing a mode configuration indicator. There are several possible ways to detect a USB mode. It is possible to detect a logic "1" on the CLK pad. Another is to detect a certain level on pad D+ or D−. These two detections can be used separately, independently or together in serial. Thus, the USB mode detector can also be on a different pad/pin than the D+ or D−, like CLK or RST or some other pad. A status register 41 is operative with the latch 40 and control register 42 and also stores data regarding the mode to operate.

A delay circuit 36 may be connected between the USB mode detector 34 and the latching circuit 40, while a power-on-reset circuit 32 may be connected between the voltage supply pad VCC and the buffer. In one example, the delay circuit 36 delays the detection by the USB mode detector 34 until a predetermined time, e.g. 1–10 ms, after first contact to avoid a false detection due to rebound. Also, a logic gate/circuit 38 may be connected between the latching circuit 40 and the detectors 30, 34. A 1.5 KOhm resistor could be connected between the D– pad DM and about 3.6V or VTERM from a voltage regulator to aid in the identification of a low-speed USB device.

In this known example, in a typical dual-mode operation, during the start-up or power-on sequence of the IC 11, the mode configuration circuit 18 configures the IC 11 to operate in one of the ISO and USB modes while disabling the other mode. For example, the reset pad RST, clock pad CLK and input/output I/O pad are disabled when the IC 11 is configured in the USB mode, and the D+ pad DP and D– DM pad are disabled when the IC 11 is configured in the ISO mode. To prevent any glitches, the detected mode is latched by the latching circuit 40 while the appropriate bit is set in the control register 42. Because the mode detection is a hardware detection, the operating system of the IC 11 will then check this bit during the reset routine to access the appropriate code for the latched mode.

Accordingly, if the smart card 10 including the dual mode IC 11 is used with a typical smart card reader, it will operate as specified in the ISO 7816 protocol while the USB interface, i.e. the D+ DP and D– DM pads, is disabled to consume less power. However, because the IC 11 includes a USB interface, ISO 7816-like transactions can be performed using a low-cost USB device rather than an ISO-compliant smart card reader. Here, the ISO mode interface, i.e. the reset RST, clock CLK and input/output I/O pads, is disabled. Once the IC 11 is configured in one of the modes, it typically stays in that mode until another power-on-reset.

For security and integrity of the dual-mode IC 11, the mode is detected as soon as possible because once the IC is configured in a mode, it will usually not be changed until another power-on-reset is executed. Further details of a possible implementation and operation of the described dual-mode IC can be found in the incorporated by reference '464 patent.

The present invention has modified the latching circuit and software in the microprocessor to allow debugging and/or software development. The USB/ISO mode detection circuit 18 detects the USB or the ISO mode at the power-on-reset of the device. Several microarchitectures are possible. For example, in the present invention, it is possible to detect the level of a "logical 1" on the clock pin of the ISO contacts. If the clock is equal to 1, it is the USB mode. If the clock is equal to 0 or is a clock signal, it is the ISO mode.

The switching block (SWB) 16 is configured in one of the two modes depending on the detection If configured in the ISO mode, the switching block 16 selects and enables the clock, reset, I/O pins, as defined in the ISO 7816 standard, or enables the D+ and D– pins of the USB port if in USB mode. The pins from the disabled port are disabled, i.e., disconnected from the rest of the device. This configuration is accomplished in the hardware and at power-on-reset. To change the mode requires that the device be powered down and powered on. This detection can be stored in a status register 41 to indicate to the embedded application code in which mode it must operate. The control register 42 enables the USB peripheral block to reduce the power consumption to the minimum when ISO mode is chosen.

The present invention modifies the hardware and logic of the switching block configuration to use an ISO 7816 or serial I/O pin following the ISO 7816 protocol as a debug and software development port when the USB mode has been detected and selected. It also allows a USB port as a debug and software development port when the ISO 7816 mode has been detected and selected.

When the mode is detected at power-on-reset, the switching block 16 will only switch the reset pin. The clock and I/O pins will stay enabled and available. This is desirable to reset the device with the correct reset signal in the mode selected. By way of example, in USB mode, it is desirable that the reset comes from the USB peripheral block and not from the reset pin of the ISO port. When detection is done, the mode signal is latched such that whatever happens on the clock pin after the detection period, nothing changes for the mode detected. The mode is the control signal for the switching block 16 to deselect the reset pin.

When the USB is reset (generated by the USB peripheral block), it is sent to the CPU and the device starts at its reset vector. When the embedded code determines the mode detected by reading the mode bit in the status register, it jumps to its USB code and enables the USB peripheral block, a USB voltage regulator which could be associated with Vterm 46 and a pull-up resistor to attach the device to the USB bus. This is done by the means of the control register 42.

The configuration of the device is such that it can normally use its USB port for a USB device application connected to a USB host, usually on a PC, and use its ISO port, including the I/O pin and clock pin to synchronize the data, with the ISO 7816 protocol. This last port can be used for debugging the USB application. It is possible to download in non-volatile on-chip memory any software patches or modules and read or write variables or the values of registers to debug the USB code.

Once the USB application is debugged and ready for production, the ISO port can be disabled by software or irreversible hardware, such as a fuse, for additional security. This can be reported to the embedded application by a status bit in the status register 41. This status bit can be a non-volatile memory bit such that at the next power-on-reset, it will be impossible to select this debug mode by configuring the switching block in USB mode or in ISO mode only.

In a similar fashion, it is possible to implement a USB debug port for an ISO smart card. At power-on-reset, the detection circuit detects a clock signal on the clock pin and selects the ISO pins for the switching block as it is done normally. At reset, the reset pin rises to 1 and the embedded code reads the mode bit and jumps to the ISO code. At this time, the USB peripheral block is not powered-up and not enabled. By setting to 1 a control bit in the control register, the application can power-up the USB peripheral block. By a second control bit, it enables the USB peripheral block, the same control bit of the USB mode, and attaches the device to the USB bus.

The configuration of the device is such that it can use its ISO port for an ISO smart card application connected to a smart card reader, and use its USB port connected to the PC as a debug port. It allows downloading in the non-volatile, on-chip memory, the software patches or modules, and to read or write variables or the value of register to debug the ISO smart card code. Once the ISO smart card application is debugged and ready for production, the USB port can be disabled by software or irreversible hardware, e.g., a fuse, for additional security. This can be reported to the embedded application by a status bit in the status register. This status bit can be a non-volatile memory bit such that the next power-on-reset will be possible to select this debug mode by configuring the SWB in ISO mode only.

Figure 2:
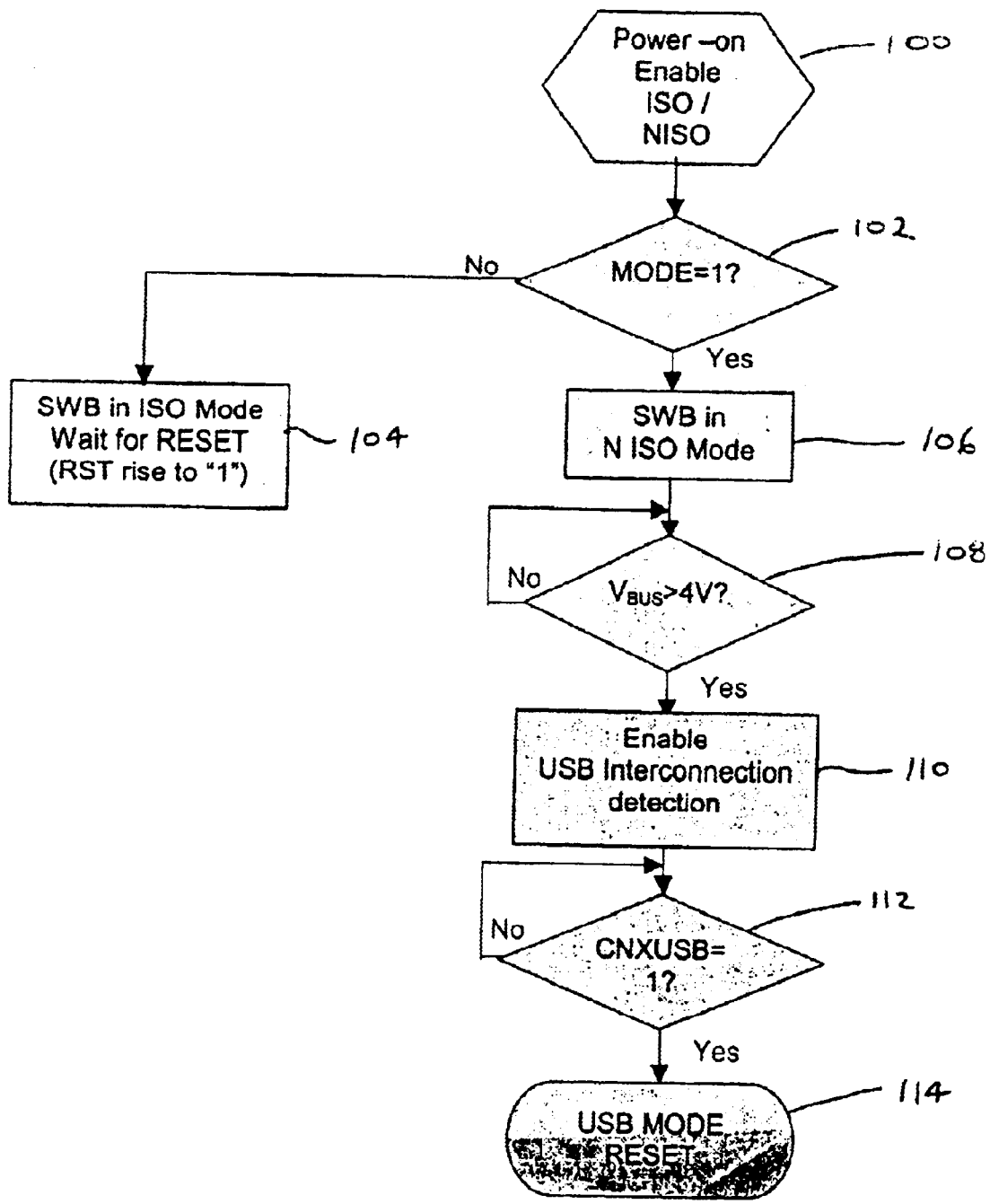
FIG. 2 is a high level flow chart illustrating an example of the ISO/USB hardware detection process that can be used in the present invention.
Figure 3:
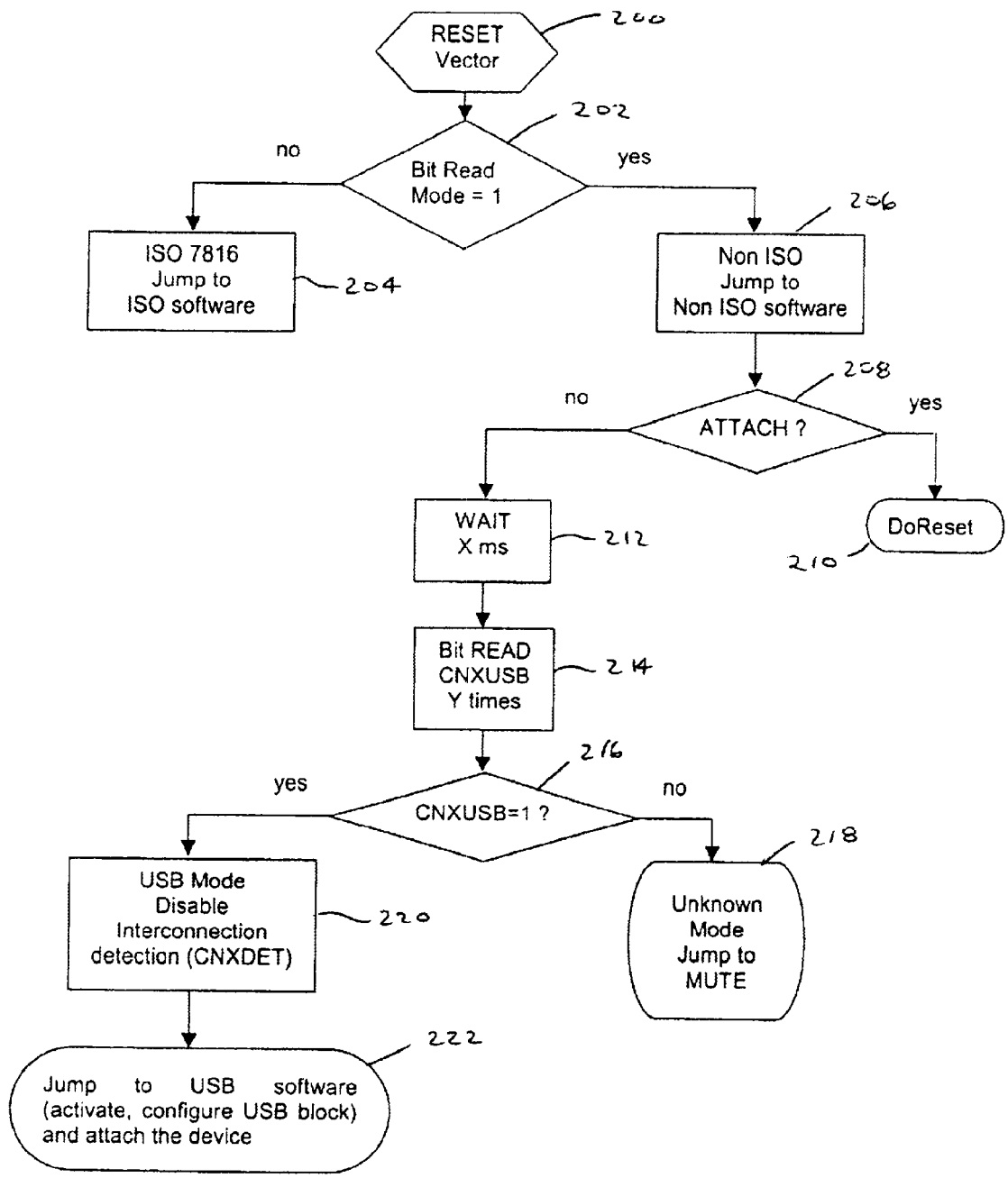
FIG. 3 is a high level flow chart illustrating an example of the software selection process that can be used in the present invention.

FIGS. 2 and 3 are flow charts for the mode detection with FIG. 2 directed to the hardware detection and FIG. 3 directed to the software selection.

For the hardware detection shown in FIG. 2, as a non-limiting example, the power-on of the device will enable the device for ISO/non-ISO (NISO) operation at block 100. If the mode is not 1 (block 102), the switching block switches in ISO mode and waits for a reset (RST rise to "1") ATR or Answer to Reset in ISO 7816 protocol (block 104). If the mode is 1, the switching block switches for the device to be in NISO mode (block 106). If the voltage at pad VBus is not greater than 4 volts (block 108), then there is a loopback. If the VBus is greater than 4 volts, then the USB interconnection detection is enabled (block 110). If the CNX USB does not equal 1 (block 112), there is a loopback, but if yes, the USB mode is selected and a USB reset is generated reset (block 114).

As to the software selection shown in FIG. 3, a reset vector is first established at block 200. If the bit read mode does not equal 1 (block 202), the ISO 7816 is selected and it jumps to the ISO software (block 204). If the bit read mode equals 1, the non-ISO is selected and jumped to non-ISO software (block 206), such as the USB software. If the device is already attached (block 208), a USB reset (block 210) is accomplished. If the device is not attached, the device waits a period of time OMS (block 212), and the bit read CNX USB Y times (block 214). If the CNX USB does not equal 1 (block 216), then the device is in an unknown mode and it jumps to mute status (block 218). If the CNX USB equals 1, the USB mode disables the interconnection detection (CNXDET) (block 220), and the code is jumped to USB software (activate, configure USB block) and the device is attached (block 220).

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. An integrated circuit for use with a smart card and operative in both an ISO mode in accordance with the International Standards Organization 7816 (ISO 7816) protocol, and a non-ISO mode in accordance with a non-ISO protocol comprising:
    a microprocessor;
    a switching block connected to the microprocessor; and
    an external interface connected to the switching block and comprising an ISO port having a serial interface and operative for communicating in an ISO mode when a ISO mode is detected and a non-ISO port operative for communicating in a non-ISO mode when a non-ISO mode is detected, wherein said microprocessor and switching block are operative for configuring the ISO port to allow debugging and/or software development through the serial interface of the ISO port in a non-ISO mode and allow debugging and/or software development through the non-ISO port in an ISO mode.

2. An integrated circuit according to claim 1, wherein said non-ISO mode comprises a USB mode and said non-ISO port comprises a USB port.

3. An integrated circuit according to claim 1, and further comprising a mode configuration circuit connected to the switching block for configuring the dual-mode integrated circuit in one of the ISO or non-ISO modes.

4. An integrated circuit according to claim 3, wherein said dual-mode configuration circuit is operative for detecting a non-ISO mode or ISO mode upon a power-on-reset.

5. An integrated circuit according to claim 1, wherein said serial interface of the ISO port comprises an I/O contact through which debugging and/or software development occurs when configured in non-ISO mode.

6. An integrated circuit according to claim 5, wherein said serial interface further comprises reset and clock contacts.

7. An integrated circuit according to claim 1, and further comprising a circuit for disabling one of the non-ISO port or ISO port used for debugging and/or software development after debugging and/or software development is completed.

8. A dual-mode smart card operative in both an ISO mode in accordance with the International Standards Organization 7816 (ISO 7816) protocol, and a USB mode in accordance with a USB protocol comprising:
    a card body;
    a dual-mode integrated circuit carried by the card body and comprising,
    a microprocessor;
    a switching block connected to the microprocessor;
    a first set of contacts forming an ISO port and including serial I/O, clock and reset contacts used in an ISO mode when a ISO mode is detected; and
    a second set of contacts forming a USB port and including D+ and D− contacts used in a USB mode when a USB mode is detected, wherein said microprocessor and switching block are operative for configuring the ISO port to allow debugging and/or software development through the ISO port in a USB mode and to allow debugging and/or software development through the USB port in an ISO mode.

9. A dual-mode smart card according to claim 8, and further comprising a mode configuration circuit connected to the switching block for configuring the dual-mode integrated circuit in one of the ISO or non-ISO modes.

10. A dual-mode smart card according to claim 9, wherein said dual-mode configuration circuit is operative for detecting a USB mode and ISO mode upon a power-on-reset.

11. A dual-mode smart card according to claim 8, wherein the reset contact is switched and deselected and the clock and I/O contacts maintained available at a power-on-reset when a USB mode is detected.

12. A dual-mode smart card according to claim 8, and further comprising a latch circuit that latches a mode signal as a control signal for switching and deselecting the reset contact in a USB mode for debugging and/or software development through the ISO port.

13. A dual-mode smart card according to claim 12, and further comprising a status register for storing a mode bit operative for jumping to a USB protocol.

14. A dual-mode smart card according to claim 8, and further comprising a circuit for disabling one of the USB port or ISO port used for debugging and/or software development after debugging and/or software development is completed.

15. A dual-mode smart card according to claim 8, wherein said switching block is operative for switching the reset pin and maintaining the clock and ISO pin in the USB mode for debugging and/or software development through the ISO port.

16. A method of operating a dual-mode integrated circuit for use with a smart card and operative in both an ISO mode in accordance with the International Standards Organization 7816 (ISO 7816) protocol, and a non-ISO mode in accordance with a non-ISO protocol comprising the steps of:

detecting a non-ISO mode or ISO mode of operation; and configuring the dual-mode integrated circuit for communicating through an ISO or non-ISO port in respective ISO or non-ISO modes of operation and debugging and/or software development through a serial interface of the ISO port when a non-ISO mode has been detected and debugging and/or software development through the non-ISO port when an ISO mode has been detected.

17. A method according to claim 16, wherein the non-ISO mode comprises a USB mode and the non-ISO port comprises a USB port.

18. A method according to claim 16, and further comprising the step of debugging through a serial I/O contact of the ISO port when the configured in the non-ISO mode.

19. A method according to claim 16, and further comprising the step of detecting a non-ISO mode or ISO mode at a power-on-reset.

20. A method according to claim 16, and further comprising the step of disabling one of the ISO port or non-ISO port through which debugging and/or software development has occurred when debugging and/or software development is completed.

21. A method of operating a dual-mode smart card operative in both an ISO mode in accordance with the International Standards Organization 7816 (ISO 7816) protocol, and a USB mode in accordance with a USB protocol comprising the steps of:

detecting a USB mode or ISO mode of operation; and configuring a switching block operative with an ISO port comprising a first set of contacts including serial I/O, clock and reset contacts used in an ISO mode, and a USB port comprising a second set of contacts including D+ and D− contacts used in the USB mode to allow debugging and/or software development through the serial I/O contact when a USB mode has been detected and debugging through the USB port when an ISO mode has been detected.

22. A method according to claim 21, and further comprising the step of detecting a USB mode or ISO mode at a power-on-reset.

23. A method according to claim 21, and further comprising the step of switching the reset contact and maintaining clock and I/O contacts available at a power-on-reset when a USB mode is detected.

24. A method according to claim 21, and further comprising the step of latching a mode signal as a control signal for deselecting the reset contact.

25. A method according to claim 21, and further comprising the step of reading a mode bit in a status register and jumping to the use of any USB code operative in the microprocessor.

26. A method according to claim 21, and further comprising the step of enabling a USB components for attaching the smart card to a USB bus.

27. A method according to claim 21, and further comprising the step of disabling one of the ISO port or USB port used during debugging and/or software development after debugging has been completed for enhancing security.

28. A method according to claim 27, and further comprising the step of reporting the disabling of one of the ISO port or USB port after debugging and/or software development by a status bit within a status register.

29. A method according to claim 21, and further comprising the step of selecting an ISO mode and connecting the USB port to a USB bus for debugging.

30. A method according to claim 21, and further comprising the step of reading a first control bit for powering a USB peripheral block and reading a second control bit and enabling a USB peripheral block.

* * * * *

UNITED STATES PATENT AND TRADEMARK OFFICE
CERTIFICATE OF CORRECTION

| | | |
|---|---|---|
| PATENT NO. | : 6,843,423 B2 | Page 1 of 5 |
| APPLICATION NO. | : 10/388067 | |
| DATED | : January 18, 2005 | |
| INVENTOR(S) | : Fruhauf et al. | |

It is certified that error appears in the above-identified patent and that said Letters Patent is hereby corrected as shown below:

Title Page, Drawing     Delete: FIG. 1
Insert: New FIG. 1

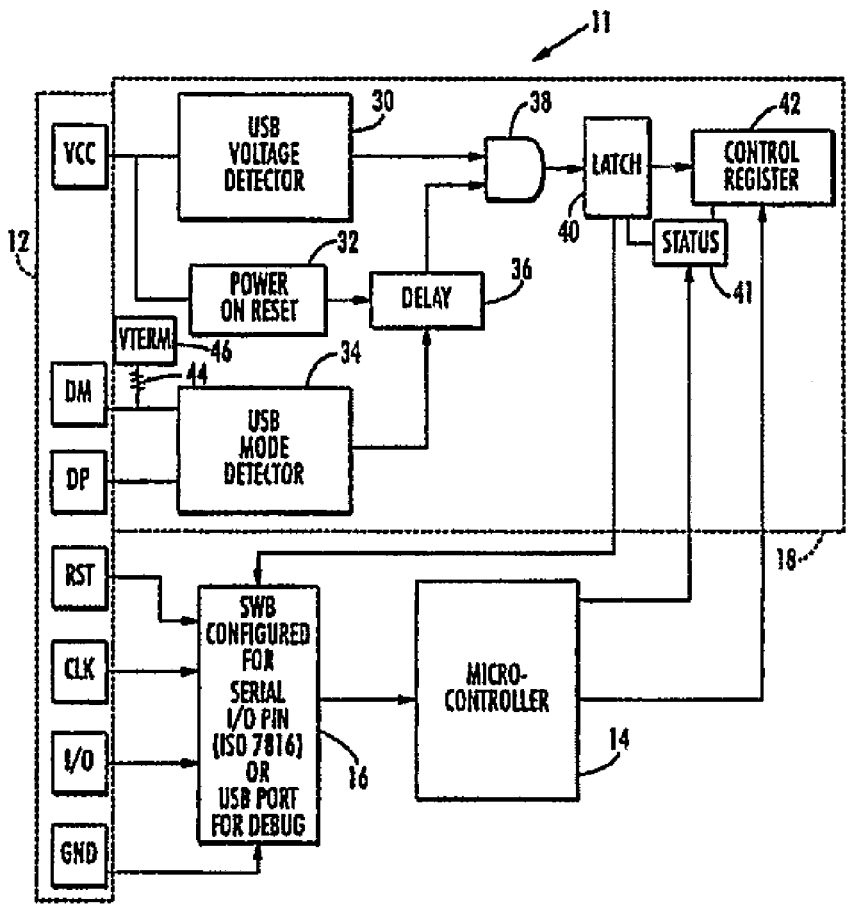

UNITED STATES PATENT AND TRADEMARK OFFICE
CERTIFICATE OF CORRECTION

PATENT NO.         : 6,843,423 B2                                      Page 2 of 5
APPLICATION NO. : 10/388067
DATED                 : January 18, 2005
INVENTOR(S)       : Fruhauf et al.

It is certified that error appears in the above-identified patent and that said Letters Patent is hereby corrected as shown below:

In the Drawings:    Delete: FIG. 1
                    Insert: New FIG. 1

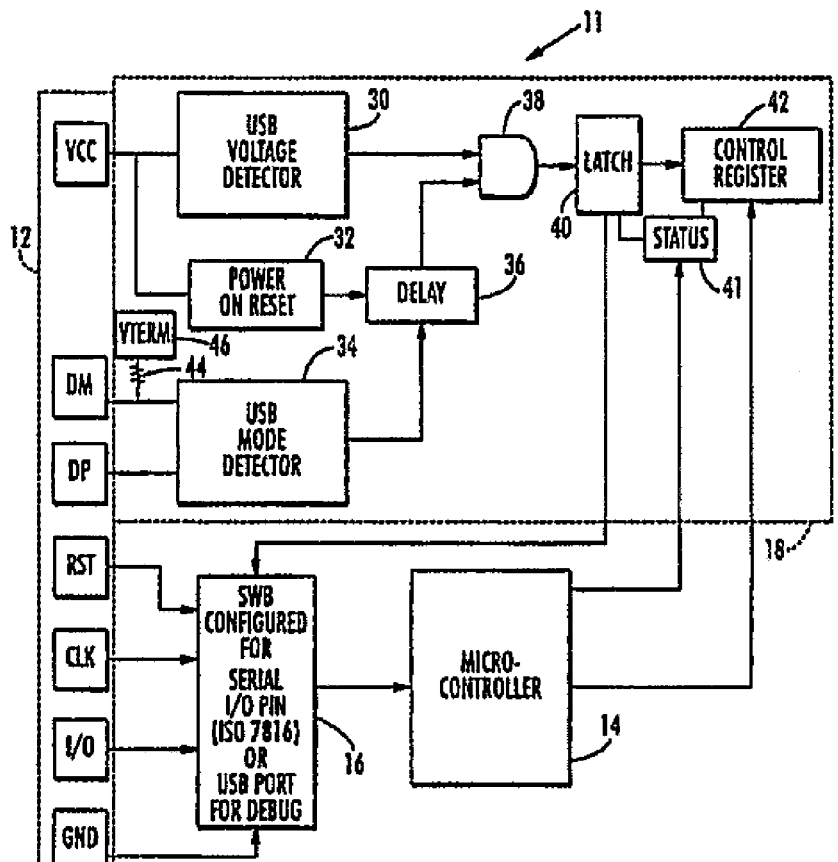

UNITED STATES PATENT AND TRADEMARK OFFICE
CERTIFICATE OF CORRECTION

PATENT NO.         : 6,843,423 B2
APPLICATION NO.    : 10/388067
DATED              : January 18, 2005
INVENTOR(S)        : Fruhauf et al.

It is certified that error appears in the above-identified patent and that said Letters Patent is hereby corrected as shown below:

In the Drawings:    Delete: FIG. 2
                    Insert: New FIG. 2

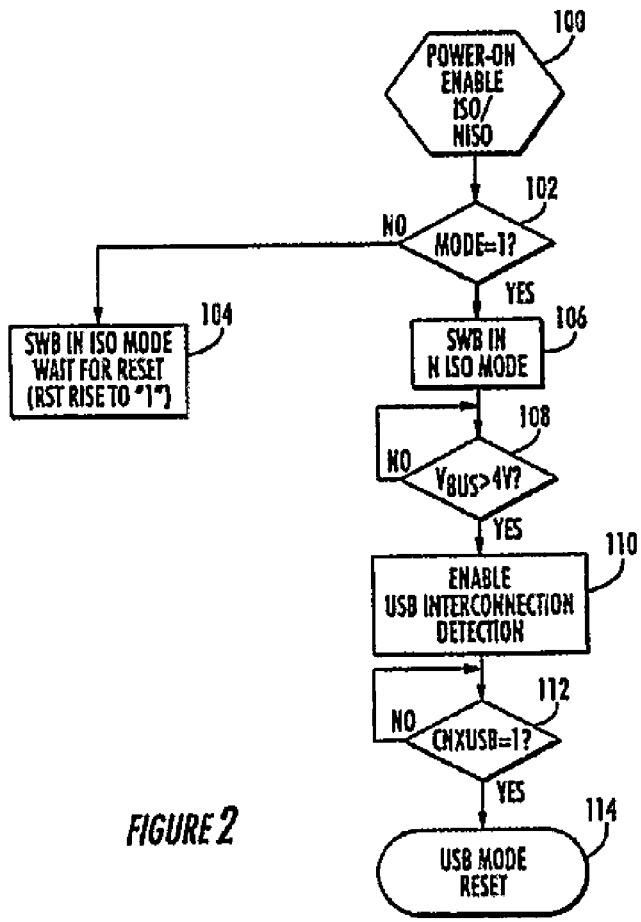

FIGURE 2

UNITED STATES PATENT AND TRADEMARK OFFICE
CERTIFICATE OF CORRECTION

PATENT NO. : 6,843,423 B2
APPLICATION NO. : 10/388067
DATED : January 18, 2005
INVENTOR(S) : Fruhauf et al.

It is certified that error appears in the above-identified patent and that said Letters Patent is hereby corrected as shown below:

In the Drawings:  Delete: FIG. 3
Insert: New FIG. 3

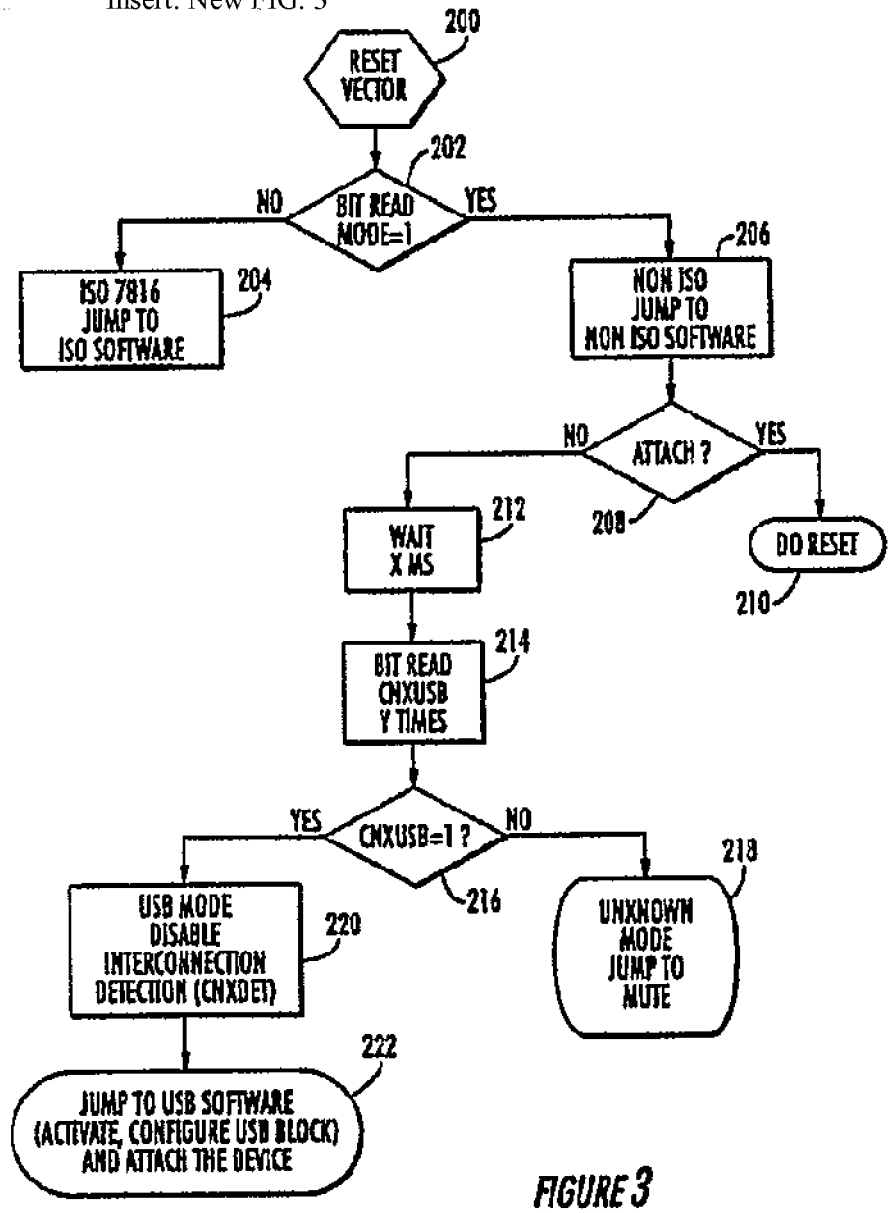

UNITED STATES PATENT AND TRADEMARK OFFICE
CERTIFICATE OF CORRECTION

PATENT NO. : 6,843,423 B2
APPLICATION NO. : 10/388067
DATED : January 18, 2005
INVENTOR(S) : Fruhauf et al.

It is certified that error appears in the above-identified patent and that said Letters Patent is hereby corrected as shown below:

| | |
|---|---|
| Column 5, Line 1 | Delete: "1a"<br>Insert: --a-- |
| Column 6, Line 1 | Delete: "ports"<br>Insert: --port-- |
| Column 6, Line 36 | Delete: "nonISO"<br>Insert: --non-ISO-- |
| Column 7, Line 17 | Delete: "D- DM pad"<br>Insert: --D- pad DM-- |
| Column 11, Line 20 | Delete: "when the"<br>Insert: --when-- |
| Column 12, Line 21 | Delete: "components"<br>Insert: --component-- |

Signed and Sealed this

Eleventh Day of September, 2007

JON W. DUDAS
*Director of the United States Patent and Trademark Office*

UNITED STATES PATENT AND TRADEMARK OFFICE
CERTIFICATE OF CORRECTION

PATENT NO.       : 6,843,423 B2
APPLICATION NO.  : 10/388067
DATED            : May 13, 2008
INVENTOR(S)      : Taylor J. Leaming It is certified that error appears in the above-identified patent and that said Letters Patent is hereby corrected as shown below:

| | |
|---|---|
| Title Page, Section (57), Last line | Delete: "the"<br>Insert: --the non-ISO port in an ISO mode.-- |
| Column 1, Line 37 | Delete: "massproduced"<br>Insert: --mass produced-- |
| Column 1, Line 39 | Delete: "depending of"<br>Insert: --depending on-- |
| Column 7, Line 53 | Delete: "detection"<br>Insert: --detection.-- |

Signed and Sealed this

Thirtieth Day of December, 2008

JON W. DUDAS
*Director of the United States Patent and Trademark Office*

UNITED STATES PATENT AND TRADEMARK OFFICE
CERTIFICATE OF CORRECTION

PATENT NO. : 6,843,423 B2
APPLICATION NO. : 10/388067
DATED : January 18, 2005
INVENTOR(S) : Serge F. Fruhauf, David Tamagno and Jerome Tournemille It is certified that error appears in the above-identified patent and that said Letters Patent is hereby corrected as shown below:

On the Title Page  Delete: "the"
Item (57), Last line  Insert: --the non-ISO port in an ISO mode.--

Column 1, Line 37  Delete: "massproduced"
  Insert: --mass produced--

Column 1, Line 39  Delete: "depending of"
  Insert: --depending on--

Column 7, Line 53  Delete: "detection"
  Insert: --detection.--

Signed and Sealed this

Sixth Day of January, 2009

JON W. DUDAS
*Director of the United States Patent and Trademark Office*

UNITED STATES PATENT AND TRADEMARK OFFICE
CERTIFICATE OF CORRECTION

PATENT NO.       : 6,843,423 B2  
APPLICATION NO.  : 10/388067  
DATED            : January 18, 2005  
INVENTOR(S)      : Taylor J. Leaming Page 1 of 1

It is certified that error appears in the above-identified patent and that said Letters Patent is hereby corrected as shown below:

| | |
|---|---|
| Title Page, Section (57), Last line | Delete: "the" <br> Insert: --the non-ISO port in an ISO mode.-- |
| Column 1, Line 37 | Delete: "massproduced" <br> Insert: --mass produced-- |
| Column 1, Line 39 | Delete: "depending of" <br> Insert: --depending on-- |
| Column 7, Line 53 | Delete: "detection" <br> Insert: --detection.-- |

This certificate supersedes the Certificate of Correction issued December 30, 2008.

Signed and Sealed this

Third Day of February, 2009

JOHN DOLL  
*Acting Director of the United States Patent and Trademark Office*